Oct. 25, 1960
A. L. TORREZ
2,957,973
PORTABLE INFRA RED RAY COOKING DEVICE
Filed Jan. 26, 1959
2 Sheets-Sheet 1
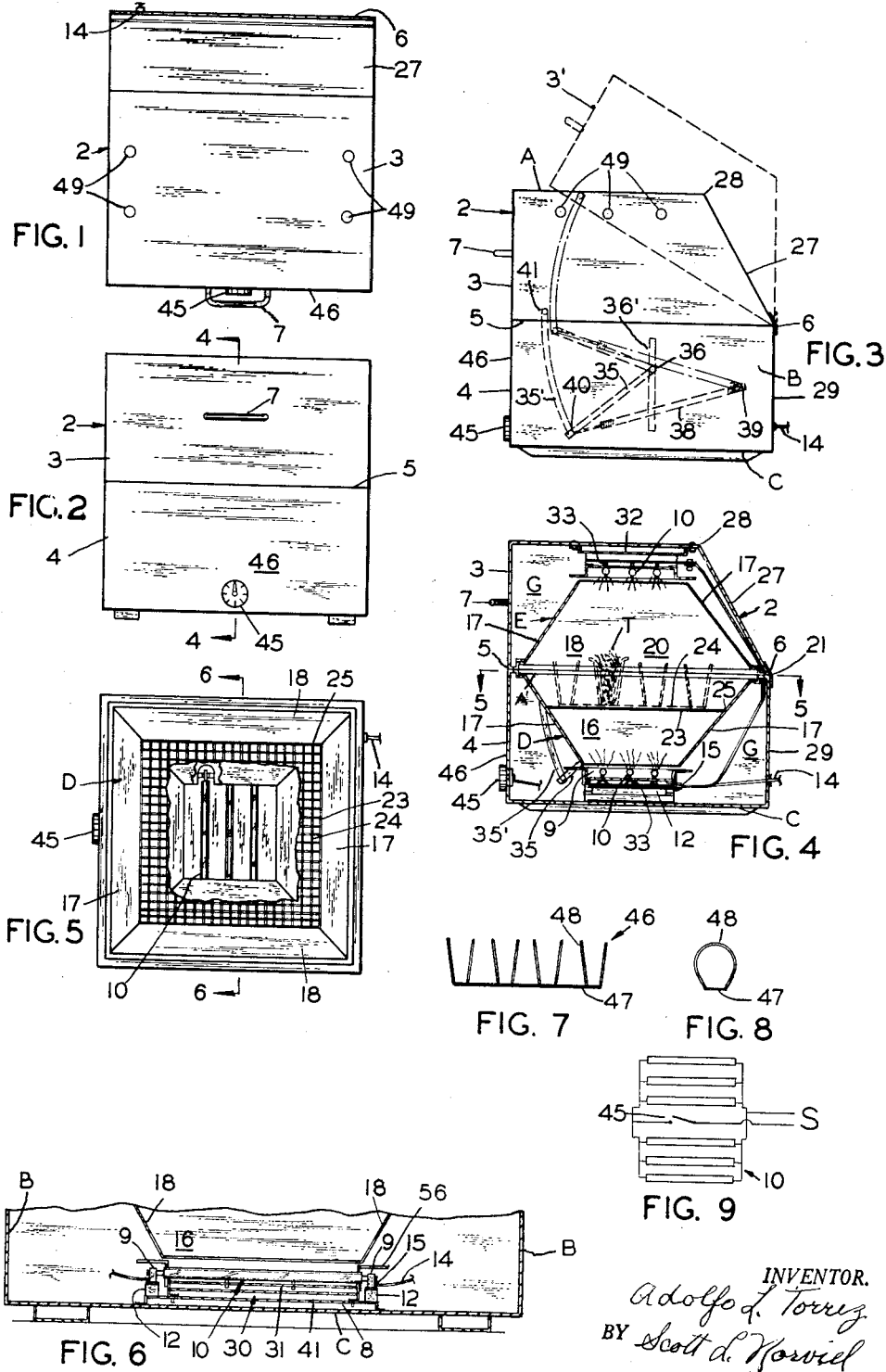
INVENTOR.
Adolfo L. Torrez
BY Scott L. Norviel
atty Oct. 25, 1960  A. L. TORREZ  2,957,973
PORTABLE INFRA RED RAY COOKING DEVICE
Filed Jan. 26, 1959  2 Sheets-Sheet 2
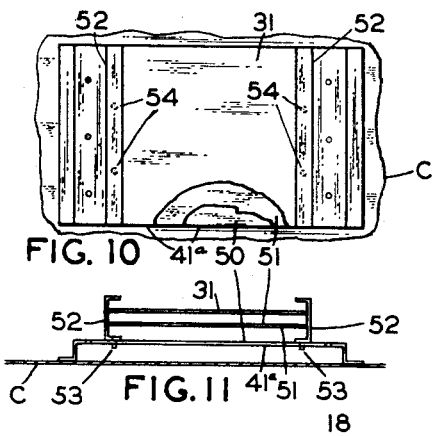
FIG. 10
FIG. 11
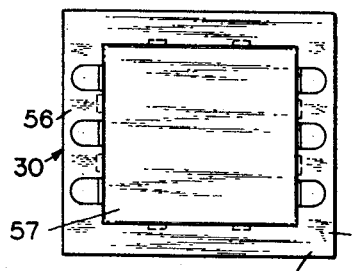
FIG. 12
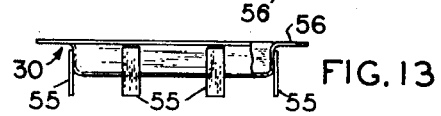
FIG. 13
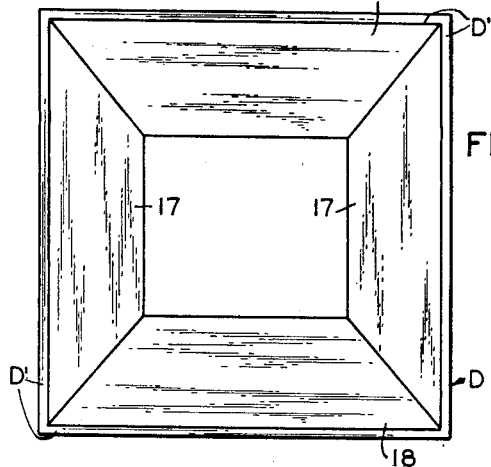
FIG. 14
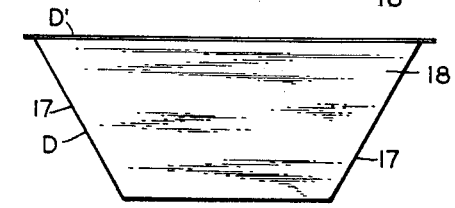
FIG. 15
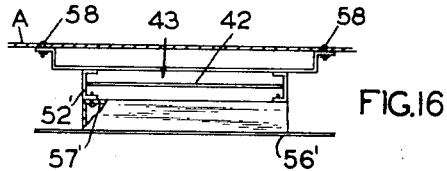
FIG. 16
INVENTOR.
Adolfo L. Torrez
BY Scott L. Norvell
Atty.

United States Patent Office 2,957,973
Patented Oct. 25, 1960

2,957,973
PORTABLE INFRA RED RAY COOKING DEVICE
Adolfo L. Torrez, 936 E. Washington, Phoenix, Ariz.
Filed Jan. 26, 1959, Ser. No. 789,078
6 Claims. (Cl. 219—35)

This invention pertains to portable infra red ray cooking devices.

More particularly, this invention concerns cooking devices using infra red ray lamps, the heat from which is reflected on the food to be cooked from above and below; the device being confined within a metal case and having reflectors to concentrate the heat upon the food to be cooked from both above and below in order to utilize all possible heat.

Still another object of the invention is to provide an electrical heat cooker using infra red ray units to concentrate heat placed upon a grill in the approximate center of the case and having a hinged top portion which will enable the device to be opened immediately for access to the interior.

Still another object is to provide a device, as above stated, wherein the reflecting elements may be easily removed from the interior of the case for cleaning.

Still another object is to provide a device, as above described, wherein the electrical circuits may be manipulated to regulate the heat required and to determine the length of time the heat is applied.

Other objects will appear hereinafter.

I attain the foregoing objects by means of the devices, parts and combinations of parts shown in the accompanying drawings wherein—

Figure 1 is a plan view of the outside enclosing case of my device;

Figure 2 is a front elevational view thereof;

Figure 3 is a side elevational view thereof with movement of the parts shown in dotted outline;

Figure 4 is a sectional elevational view of the device, as shown in Figure 3, with the section taken substantially on lines 4—4 of Figure 2;

Figure 5 is a plan view of the bottom part of my device; and

Figure 6 is a partial sectional elevational view of the device, as shown in Figure 5, with the section taken on line 6—6 Figure 5;

Figure 7 is a side view of a food holder;

Figure 8 is an end view of the holder; and

Figure 9 is an electrical diagram of the wiring connecting the heating elements.

Figure 10 is a plan view of the bottom heating element support, and insulating plates, after removal from the case;

Figure 11 is a side elevation thereof;

Figure 12 is a plan view of the collar and its reflecting flanges, which surround the bottom heating elements after removal from the case;

Figure 13 is a side elevation thereof;

Figure 14 is a plan view of the removable main bottom reflector unit, after removal from the case;

Figure 15 is a side elevation thereof; and

Figure 16 is a side elevation of the top insulator, reflector and heating element support with the heating elements not shown.

Similar numerals refer to similar parts in the several views.

While the device hereinafter disclosed is useful for cooking of or heating all kinds of foods it is best suited to the warming and recooking of dishes prepared in the Spanish or Mexican style wherein the food has been previously cooked and mixed and then stored under refrigeration until such time as it is needed. This type of food is then thawed, warmed and then cooked with a sauce and cheese covering. To make this type of food most appetizing it is necessary to warm and heat the sauce and cheese and at the same time warm and recook the objects of food. Foods of this nature are sometimes called enchiladas, or tacos, or tostados. The exact nature or content of these foods is immaterial to the present invention; however, all require warming and cooking as above stated and it is understood that the presently described device is capable of warming and heating these items of food, as well as others of a similar nature, in an efficient and rapid manner.

Since the preferred form of the device, as hereinafter described, is of comparatively light, and portable weight, the outside case 2 is made of sheet metal. It is substantially rectangular in shape and of a size adapted to be supported upon a table or bench.

The case 2 is made of two sections 3 and 4 and are joined together along a horizontal meeting line 5. Both sections are substantially the same in structure. A hinge 6 joins the two case sections at the rear and a handle 7 permits the user to raise the top section 3 above the lower section 4, as shown best in Figure 3. Each section is enclosed by sides B. The bottom section 4 has a front 46 and back 29, and a bottom C, while the top is closed by panels A and 27.

Within the lower section 4 there is a bank of electrical heating elements 10. This bank is composed of a series of horizontal tubular infra red ray heaters of the type that is replaceable and which are held at the ends by clips 9. Clips 9 are joined by bus bars 15 and these, in turn, are supported on the case bottom C. The several clips at each end of the heating elements 10 are joined to bus bars 15 at each end and these bus bars are connected to a two conductor cord 14.

The heating elements direct rays upward into and beyond the space marked 16. This is enclosed by angularly positioned reflectors 17 on the forward and back sides, and 18 on the lateral sides of the rectangular cooking area 20.

About two-thirds of the distance from the bank 10 of infra red ray heating elements to the plane 21 of the top edge of the lower reflector 17, there is a grill 23 consisting of a coarse screen 24 having smooth edging rods 25 and this is removably supported on the slanting faces of the reflectors 17, 17 fore and aft, and 18, 18 at the sides.

The top portion 3 of the complete case 2 is constructed similarly to the bottom part except that the rear face 27 is positioned at an angle relative to the vertical. This prevents the rear top edge 28 from extending beyond the plane of the face of the rear plate 29 of the bottom portion 4 when the top part 3 is lifted, as shown in dotted lines in Figure 3, when the device is open.

Within the top portion there are supports 32 which hold infra red ray heating elements 10 by clips 33 at each end, in the same manner as the elements 10 are held in the lower part of the device by supports 12.

To hold the upper and lower parts 3 and 4 of the case 2, resiliently, in closed or raised position I provide links 35 and 35' pivotally joined by pin 40. The rear end of link 35 is pivotally joined at 36 to a vertical brace bar 36' attached to the inner face of side B of lower case section 4. The upper end of link 35' is pivotally attached to the fore part of top case section 3 at 41. A spring 38 is attached to pin 40 and extends rearwardly beyond brace bar 36' to an attaching bolt 39 on the side B of the lower case part 4. This bolt is positioned so that when the top case section 3 is raised, pin 40 is above dead center relative to pin 36 and there is sufficient spring tension on pin 40 to keep link 35 raised and support the weight of top case section 3. As the top case section 3 is lowered, pin 40, moving in a downward arcuate path, passes dead center relative to pivoted joint 36 on brace bar 36' and moves to a position below dead center where the tension of the spring holds top case part 3 down on the upper edge of lower case part 4.

The above-described arrangement of parts may be termed a resilient top case part positioning linkage. There may be a linkage of this type on each side of case 2.

Switch 45 is positioned on the front wall 46 of the lower section 4. This may be either a simple switch which will turn all elements on or off, as desired, or it may be a delayed action time switch which will control the time of the heating element 10, as desired.

To illustrate one of the uses of the device, a holder 46a for tacos is shown resting on grill 23. This consists of a wire base 47 (Figures 7 and 8) to which upstanding wire loops 48 are welded. Tacos T are placed between the loops, as shown in Figure 4. These items of food are difficult to hold and this special holder is provided, and is illustrated as an example of the heating and cooking abilities of the device.

Heat from the elements 10 is confined by insulating base plate 8 and top insulating base plate 32. Heat directed into the cooking area 20 by all elements impinges on food placed on grill 23. Stray rays of heat are redirected onto the grill 23 by the angularly positioned walls 17 and 18 of the lower reflector element D and by the walls 17 and 18 of the upper reflector element E. These reflectors confine the heat to the area 16 and the cooking area 20, and at the same time keep the major portion of the heat away from the outer walls of the case 2. There is an insulating air space G between the reflectors and the walls of the outer case. Vent holes 49 are formed in the outer case walls to provide a change of air in space G.

To make a provision for cleaning, the top edges D' the lower reflector D merely rest on the upper edges A' of the lower case part 4 and the grill 23 merely rests on the angularly slanting walls 17 and 18 of this lower case part. Bottom reflector assembly 30 is removable from its position surrounding heating elements 10, and horizontal reflector plate 31, disposed over bottom insulation 41a, is also removable for cleaning. There is a similar horizontal plate 42 below top insulation 43, but these parts are permanently fastened in place.

As here shown the insulation 41 and 43, between the upper and lower case plates, A and C, respectively, and the upper and lower heating elements, is of the open multi-plate reflector type. The bottom insulating assembly includes the bottom attaching member plate 50 (see Figures 10 and 11), a thin reflecting plate 51, and top reflecting plate 31 spaced above plate 50 which is positioned just below the heating elements 10 when they are added, as shown in Figures 4 and 5. The insulation assembly 41, Figure 6, is held at the sides by C shaped side members 52, Figure 11, which are provided with positioning pins 53 which enter positioning holes 54 in plate 50.

The reflecting collar assembly 30 rests on the top faces of side members 52 and is held by tabs 55 which frictionally engage the sides of said members 52 and fore and aft edges 41a of plates 50 and 31. Reflecting flanges 56 of reflector assembly 30 are provided with holes to admit the ends of the heating elements 10 when they are in position. This assembly has its bottom plate or pan 57 made integral with flanges 56.

The corresponding top insulation parts 43 and insulation assembly (see Figure 16) are substantially the same as the lower parts, above described, but are disposed in reverse order. These parts are secured in place by screws 58. Where not otherwise marked the corresponding top parts are marked with a primed number of the lower part.

Figures 10 through 13 are intended to show the several parts after removal from the case 2.

Figures 14 and 15 show the main reflector after removal from case 2, and

Figure 16 shows the upper reflector assembly only, and without inclusion of the heating elements or their supports.

In use the upper part 3 is raised and food placed on grill 23 (tacos for example). The upper case part 3 is closed and the switch 45 closed. After the cooking is completed case part 3 is raised and the cooked food removed.

I claim:

1. A portable infra red ray cooking device consisting of a rectangular case having, a top, bottom, sides, front and back, divided horizontally and centrally into an upper section and a lower section, having mating edges, hinges joining the mating edges of the backs of said sections, a resilient top case section positioning linkage operatively attached between said case sections and adapted to hold said case top section resiliently in raised open position or lowered closed position, electrical heating elements centrally disposed on the inner face of said lower case section, reflectors having removable reflecting plates provided with a central opening surrounding said heating elements and extending on an incline therefrom to the top edges of the sides, front and back of said lower case section, said reflectors being positioned to direct heat rays from said heating elements into a centrally disposed cooking area within said case, a horizontal grill in said lower case section, adapted to hold articles for cooking, removably supported on the upper parts of the reflecting plates surrounding said heating elements in said lower case section, a bank of electrical infra red ray heating elements centrally disposed on the inner face of said upper case section, reflectors having plates surrounding said heating elements and disposed to direct heat rays into said cooking area, and electrical conductors adapted to connect said electrical heating elements to a source of electrical energy.

2. A portable infra red ray cooking device consisting of a rectangular case having, a top, bottom, sides, and front and back, divided horizontally and centrally into an upper section and a lower section, hinges on the adjacent edges of the backs of said case sections, a bank of tubular electrical infra red heating elements held in place by electrical attaching clips disposed in said lower case section and centrally disposed on the upper face of the bottom of the lower case section, a removable horizontal reflector plate disposed below said heating elements, a bottom reflector assembly including a collar having horizontal reflective surfaces surrounding said bank of tubular heating elements at a level just above their upper sides, and a main reflector element, including four plates, having their lower edges disposed immediately above said bottom reflector assembly extending angularly upward and outward to and resting on the top edges of each side and the top edges of the front and back, of said lower case section, a horizontal grill resting on the upper parts of the faces of said angularly extending reflectors, a bank of electrical infra red ray heating elements centrally disposed on the inner face of the top of the upper section of said case part, reflector plates surrounding said bank of heating elements on said top including angularly disposed side and front and bacsk plates extending to the side edge and front and back edges, respectively, of the upper case section, said reflector plates being positioned to direct heat rays from said bank of heating elements toward the area within said case immediately above said grill, and electrical wiring connecting said heating elements to a source of electrical energy.

3. The device as described in claim 2 wherein all elements in the lower case section having reflecting surfaces are removably disposed in the said lower case part whereby they may be removed for cleaning.

4. In an infra red cooking device the combination of: a casing having adjacent separable upper and lower sections; radiant heating elements in said upper and lower sections respectively; upper and lower reflectors in said upper and lower sections respectively. said upper and lower reflectors having surfaces surrounding said heating elements, said surfaces of each reflector diverging toward the other reflector and the adjacent sections; said lower reflector having an opening between its reflecting surfaces at both its upper and lower ends, said opening in said lower reflecttor at its lower end being larger than the overall dimensions of said heating elements in the lower area of said lower section permitting facility for the removal of said lower reflector upwardly of the heating elements in said lower section; and a grill supported by the diverging reflector surfaces of said lower reflector, said grill supported between the upper and lower open ends of said lower reflector.

5. In an infra red cooking device the combination of: a casing having adjacent separable upper and lower sections; radiant heating elements mounted in said upper and lower sections, respectively; upper and lower reflectors in said upper and lower sections, respectively, said upper and lower reflectors having surfaces divergingly extending outwardly of said heating elements, said surfaces of each reflector diverging toward the other reflector and the adjacent sections; one of said reflectors having an opening between its reflecting surfaces at each of its upper and lower ends, said heating elements disposed centrally of said openings permitting facility for the removal of the one of said reflectors relative to its respective heating element.

6. The device as set forth in claim 2 wherein said collar is positioned on the lower case plate and held by gravity only and is removable after the heating elements are removed from their electrical attaching clips.

References Cited in the file of this patent

UNITED STATES PATENTS

| | | |
|---|---|---|
| 1,790,083 | Armstrong | Jan. 27, 1931 |
| 1,973,175 | McArdle | Sept. 11, 1934 |
| 2,708,708 | Ronsch | May 17, 1955 |
| 2,764,664 | Steward | Sept. 25, 1956 |